(12) United States Patent
Miyake et al.

(10) Patent No.: US 7,960,890 B2
(45) Date of Patent: Jun. 14, 2011

(54) LAMINATED CORE, METHOD AND APPARATUS FOR MANUFACTURING LAMINATED CORE, AND STATOR

(75) Inventors: Nobuaki Miyake, Tokyo (JP); Yuji Nakahara, Tokyo (JP); Masahiro Yuya, Tokyo (JP); Yukinobu Karata, Tokyo (JP); Akira Hashimoto, Tokyo (JP)

(73) Assignee: Mitsubishi Electric Corporation, Chiyoda-Ku, Tokyo (JP)

( * ) Notice: Subject to any disclaimer, the term of this patent is extended or adjusted under 35 U.S.C. 154(b) by 46 days.

(21) Appl. No.: 12/352,316

(22) Filed: Jan. 12, 2009

(65) Prior Publication Data
US 2009/0195110 A1 Aug. 6, 2009

(30) Foreign Application Priority Data
Jan. 23, 2008 (JP) .................... 2008-012204

(51) Int. Cl.
*H02K 1/06* (2006.01)
(52) U.S. Cl. ............. 310/216.058; 310/216.065; 310/43
(58) Field of Classification Search ........... 310/216.058, 310/216.065, 216.066, 43
See application file for complete search history.

(56) References Cited

U.S. PATENT DOCUMENTS

| | | | | |
|---|---|---|---|---|
| 2,542,048 A | * | 2/1951 | Nagel | 442/173 |
| 4,103,195 A | * | 7/1978 | Torossian et al. | 310/216.065 |
| 4,665,329 A | * | 5/1987 | Raschbichler | 310/13 |
| 5,168,662 A | * | 12/1992 | Nakamura et al. | 451/46 |
| 6,075,304 A | * | 6/2000 | Nakatsuka | 310/216.137 |
| 2005/0067915 A1 | | 3/2005 | Ida et al. | |

FOREIGN PATENT DOCUMENTS

| | | |
|---|---|---|
| JP | 3294348 B2 | 4/2002 |
| JP | 2002-164224 | 6/2002 |
| JP | 2003-324869 A | 11/2003 |
| JP | 2005-269732 | 9/2005 |
| JP | 3822020 B2 | 6/2006 |
| JP | 2008-67459 A | 3/2008 |
| JP | 2008-78345 A | 4/2008 |
| JP | 2008-78346 A | 4/2008 |

* cited by examiner

*Primary Examiner* — Thanh Lam
(74) *Attorney, Agent, or Firm* — Buchanan Ingersoll & Rooney PC (57) ABSTRACT

A laminated core block includes a plurality of core members made of magnetic sheets stacked one on top of another, the plurality of core members including first and second core members which adjoin in a laminating direction, and a thermoplastic resin strand placed between the first and second core members. The thermoplastic resin strand is arranged to pass along one side surface of the first core member, between the first and second core members and along a side surface of the second core member on a side opposite to the aforementioned side surface of the first core member in this order. The first and second core members are bonded to each other by melting and curing the thermoplastic resin strand.

19 Claims, 6 Drawing Sheets

LAMINATED CORE, METHOD AND APPARATUS FOR MANUFACTURING LAMINATED CORE, AND STATOR

BACKGROUND OF THE INVENTION

1. Field of the Invention

The present invention relates to a laminated core used in a motor, a generator, a transformer, or the like, the laminated core being configured by laminating core members which are made of magnetic sheets. The invention relates also to a method and an apparatus for manufacturing a laminated core as well as a stator employing the laminated core.

2. Description of the Background Art

A conventional method of manufacturing a laminated core uses a punch swaging process in which core members are laminated as the same are punched from a beltlike thin sheet and swaged together. In the punch swaging process, thicknesswise protruding and recessed parts are formed in the individual core members with the protruding part formed on a front side of each core member and the recessed part formed in a rear side thereof, for example, and when a plurality of such core members are laminated, the core members are fixed one on top of another with the protruding and recessed parts of the core members adjoining in a laminating direction securely fitted and joined together by the application of pressure as described in Japanese Patent No. 3294348, for example.

Japanese Laid-open Patent Application No. 2003-324869 introduces another conventional method of laminating a plurality of core members by use of a dielectric adhesive. According to this method, the adhesive may be applied to surfaces of the individual core members by a steel sheet manufacturer or by a laminated core manufacturer (assembler) to join the core members. Alternatively, the laminated core manufacturer may by soak the stacked core members in a bath of the adhesive to join the core members together.

In addition, Japanese Patent No. 3822020 discloses an apparatus mounted on a press forming line for manufacturing a laminated core. The apparatus includes an adhesive applicator for applying adhesive at specific points in a spotted pattern on at least one of top and bottom surfaces of each thin-walled steel sheet (core member) and a holding mechanism in which individual core members punched into a specific shape by a pressing machine and applied with the adhesive are successively stacked and joined together by adhesive bonding.

There is a growing need today for energy savings and higher efficiency in various kinds of equipment using motors. In this connection, recent arguments have focused on drawbacks of the conventional manufacturing methods of laminated cores.

According to the aforementioned punch swaging process, the protruding and recessed parts are formed on both sides of each core member and the core members stacked one on top of another are swaged together by applying the pressure. This conventional method has a problem that the core members are deformed in areas around the protruding and recessed parts pressurized so that a dielectric coating formed on electromagnetic steel sheets could break, thereby causing short circuits between the laminated core members and resultant degradation of magnetic property of the laminated core. This problem has been a bottleneck in increasing the efficiency of the equipment using motors.

Although there is a known technique for reduce eddy current by laminating a larger number of thin-walled core members to improve the magnetic property, this approach poses a problem that it difficult to form the protruding and recessed parts on the thin-walled core members.

Also because swaged portions of the core members are joined simply by press-fitting the protruding parts into the recessed parts, not all of the laminated core members are perfectly fixed together but gaps may be created between some of the core members. Consequently, there has been a problem that the laminated core could produce noise when used due to relative movements of the core members.

One approach to reducing the degradation of the magnetic property of the laminated core due to processing deformation thereof would be to bond the stacked core members by an adhesive. This approach however causes a loss of cost and an environmental problem, because, in the manufacture of the laminated core, a steel sheet coated with a thermosetting resin adhesive at the steel sheet manufacturer is press-cut and unused part of the steel sheet trimmed away therefrom is discarded together with the adhesive coating.

When the laminated core manufacturer applies the adhesive as in the case of Japanese Patent No. 3822020, for example, there can occur sagging, clogging, webbing or like phenomena of the adhesive depending on the viscosity of the adhesive and/or cleanness of an applicator head, resulting in such problems as variations in spread of the adhesive and difficulties in achieving desired bonding and dimensional accuracies and bond strength. There can also occur such problems as dripping of the adhesive to manufacturing facilities or finished products (laminated cores) as well as difficulties in production line management and maintenance with respect to the shelf life of the adhesive and ambient temperature and humidity suitable for the prevention of adhesive clogging, webbing, and so on.

While the prior art discloses the method of laminating the stacked core members by soaking the same in the adhesive as shown in Japanese Laid-open Patent Application No. 2003-324869 as well as a method of causing the adhesive to infiltrate gaps between the cut-out core members, it is difficult for the adhesive to perpetrate into the gaps under atmospheric conditions. Thus, the stacked core members are often impregnated with the adhesive like varnish under vacuum pressure by a laborious process.

In the manufacture of a multi-block laminated core of a motor stator, a plurality of laminated core blocks produced by individually laminating core members, each having a tooth portion and a yoke portion, are arranged in an annular form and assembled together by shrink-fitting a frame on the laminated core blocks thus arranged. When a radial stress is exerted on the cylindrically arranged laminated core blocks from outside, as a result of shrinkage of the frame, a contact stress acts between the frame and the core blocks or between the core blocks. Part of the contact stress is left in the form of residual stress in the laminated core product at the end of this assembly process, and the residual stress within the laminated core could increase iron loss therein due to magnetic property degradation of core material of the laminated core especially in a high-efficiency motor. This has been a bottleneck in increasing the efficiency of the motor stator employing the multi-block laminated core.

In addition, parts of press-cut surfaces of the individual laminated core blocks constituting curved outer surfaces thereof are held in contact with the frame, so that the laminated core members, or laminations, made of electromagnetic steel sheets having insulating surface coatings are short-circuited each other through the frame. Other parts of the press-cut surfaces of the laminated core blocks constituting circumferential end surfaces thereof are short-circuited between the adjacent core blocks due to deviations of the thickness of the core material or gaps between the laminations. This also causes an increase in iron loss, serving as a hindrance to increasing the motor efficiency.

SUMMARY OF THE INVENTION

The present invention is intended to overcome the aforementioned problems of the prior art. Accordingly, it is an object of the invention to provide a laminated core and a stator which make it unnecessary to swage core members, apply an adhesive thereto or cause the adhesive to permeate thereinto in a process of laminating the core members, yet providing stable bonding accuracy and bond strength in the laminating process as well as high productivity and excellence in magnetic performance, stiffness and accuracy.

In one aspect of the invention, a laminated core block includes a plurality of core members made of magnetic sheets stacked one on top of another, the plurality of core members including first and second core members which adjoin in a laminating direction, and a thermoplastic resin strand placed between the first and second core members, wherein the thermoplastic resin strand is arranged to pass along one side surface of the first core member, between the first and second core members and along a side surface of the second core member on a side opposite to the aforementioned side surface of the first core member in this order, and the first and second core members are bonded to each other by melting and curing the thermoplastic resin strand.

In another aspect of the invention, a method of manufacturing a laminated core block by laminating a plurality of core members made of magnetic sheets stacked one on top of another, the plurality of core members including first and second core members which adjoin in a laminating direction, includes the steps of arranging a thermoplastic resin strand to pass along one side surface of the first core member, between the first and second core members and along a side surface of the second core member on a side opposite to the aforementioned side surface of the first core member in this order, and bonding the first and second core members to each other by melting and curing the thermoplastic resin strand.

In still another aspect of the invention, an apparatus for manufacturing a laminated core block by laminating a plurality of core members made of magnetic sheets stacked one on top of another is provided with a punching mechanism including a punching head and a die, the punching mechanism being configured to successively punch out the plurality of core members from a band magnetic sheet as the punching head descends into the die, and a nozzle configured to be movable back and forth between the die and a stacker to supply a thermoplastic resin strand in such a manner that the thermoplastic resin strand is folded between the core members adjoining in a laminating direction thereof passing along side surfaces of the core members each time the core member is punched out and stacked in the stacker.

According to the present invention summarized above, the thermoplastic resin strand is continuously routed between the adjacent core members, melted by application of heat and cured to thereby bond the core members together, rendering swaging operation unnecessary and making it possible to produce laminated core blocks with reduced degradation of magnetic property and iron loss thanks to minimal risk of processing deformation and short circuits between laminations.

The thermoplastic resin strand has a threadlike structure and is continuously routed to melt and cure between the laminated core members. Unlike the case of the swaging operation in which individual core members are locally joined at protruding and recessed parts, the thermoplastic resin strand joins the individual core members over specific surface areas so that the laminating process of the invention makes it possible to increase the stiffness of the laminated core blocks and manufacture a motor or the like whose laminated core blocks produce substantially reduced electromagnetic interference and vibration.

The thermoplastic resin strand having the threadlike structure is continuously placed between the laminated core members as mentioned above. Unlike the earlier described conventional method of laminating a plurality of core members by an adhesive applied to bonding surfaces thereof, the laminating process of the invention using the continuously routed thermoplastic resin strand makes it possible to manufacture laminated core blocks having high accuracy in shape and strength by stably using a least sufficient quantity of thermoplastic resin to produce a thin resin layer for ensuring the accuracy and strength, yet absorbing accumulated dimensional errors caused by thickness deviations of the core members.

Furthermore, since the thermoplastic resin strand for has an easy-to-handle threadlike structure, the thermoplastic resin strand can easily be positioned and routed between the adjacent core members without the need for laborious operation to cope with the aforementioned problems of the conventional laminating method related to production line management and maintenance, such as sagging, clogging and webbing of the adhesive. As the thermoplastic resin strand can be heated to melt for bonding the core members at any convenient time during a laminated core manufacturing process, it is possible to produce the laminated core blocks with high productivity.

Moreover, when the laminated core blocks are to be disposed of, the laminated core blocks can be disassembled by remelting the thermoplastic resin by application of heat. This feature of the invention serves to reduce recycling cost of laminated stator cores.

A stator of the invention produced by assembling a plurality of cylindrically arranged laminated core blocks is provided with the thermoplastic resin strand arranged between a frame and the laminated core blocks and between the adjacent laminated core blocks. The thermoplastic resin strand thus arranged serves to mitigate a contact stress acting on the laminated core blocks and prevent short circuits between the laminated core members, making it possible to manufacture highly efficient motors with reduced iron loss with high productivity.

The foregoing and other objects, features, aspects and advantages of the present invention will become more apparent from the following detailed description when read in conjunction with the accompanying drawings.

DETAILED DESCRIPTION OF THE PREFERRED EMBODIMENTS OF THE INVENTION

First Embodiment

Figure 1:
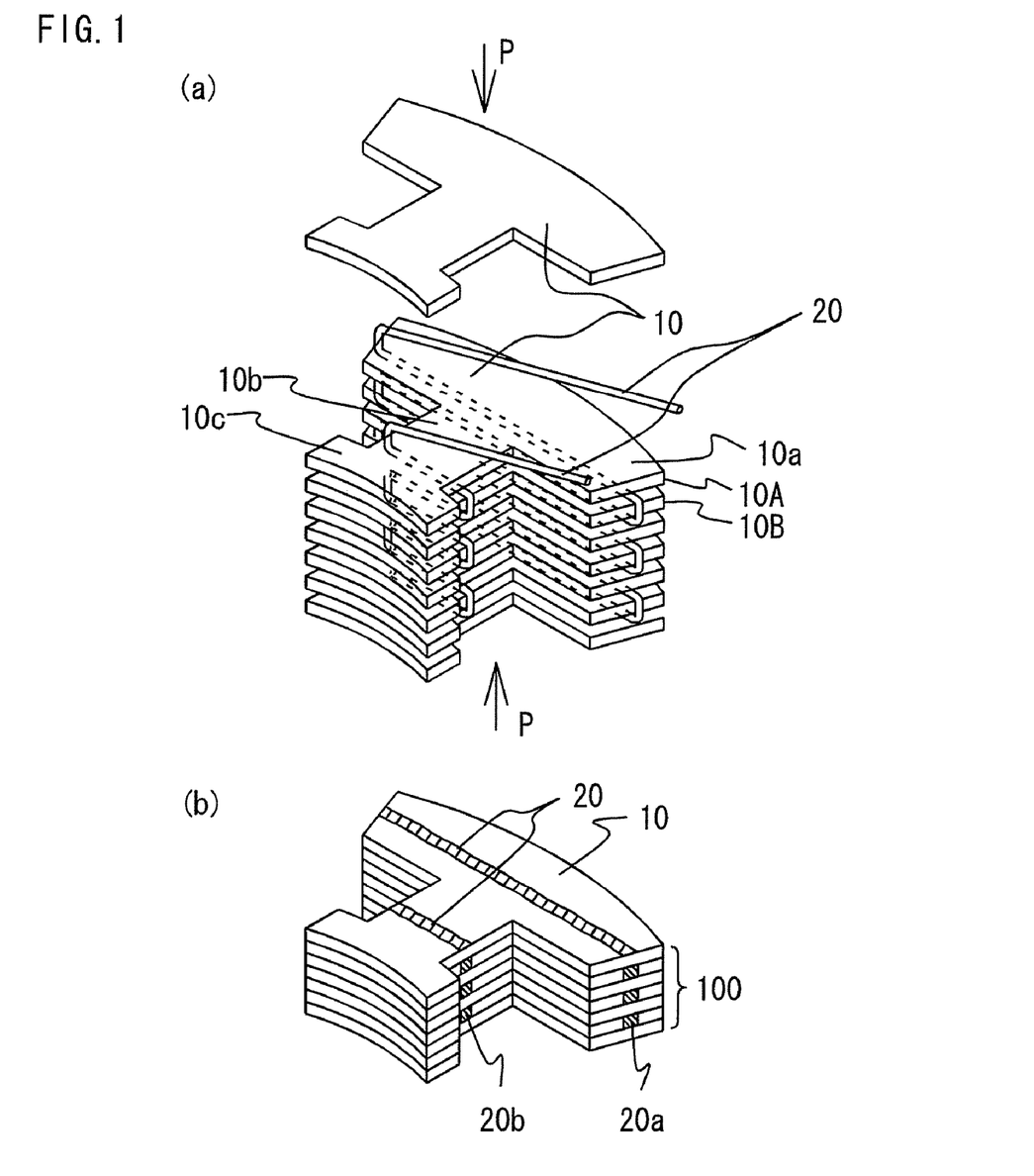
FIGS. 1A and 1B are perspective views showing the structure of a laminated core block according to a first embodiment of the invention.
Figure 2:
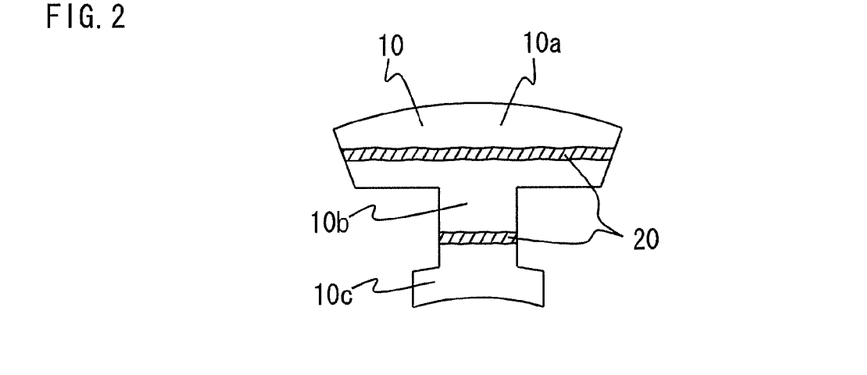
FIG. 2 is a plan view showing an arrangement made between individual core members of the laminated core block of the first embodiment.

FIGS. 1A and 1B are perspective views showing the structure of a laminated core block 100 according to a first embodiment of the invention, in which FIG. 1A depicts a state before a laminating process and FIG. 1B depicts a state after the laminating process. FIG. 2 is a plan view showing an arrangement made between individual core members 10 of the laminated core block 100 of FIGS. 1A and 1B. As shown in these Figures, the laminated core block 100 is constructed by laminating a plurality of core members 10 which are magnetic sheets like iron sheets or electromagnetic steel sheets measuring approximately 1 mm or less in thickness. Each of the core members 10 has generally a T-shape including a yoke portion 10a, a tooth portion 10b extending from the yoke portion 10a and a tooth end portion 10c located at a far end of the tooth portion 10b.

In this embodiment, a threadlike thermoplastic resin strand 20 is placed between the individual core members 10 to run side to side across the yoke portions 10a and the tooth portions 10b thereof in a direction generally at right angles to a projecting direction of each tooth portion 10b. The thermoplastic resin strand 20 which has passed between any two adjoining core members 10 is routed to pass along a side surface of one of the two core members 10 and between next two adjoining core members 10. More specifically, to run the thermoplastic resin strand 20 between two core members 10 adjoining in a laminating direction, e.g., the first core member 10A and the second core member 10B, the thermoplastic resin strand 20 is passed along one side surface of the first core member 10A and between the first core member 10A and the second core member 10B. Then, the thermoplastic resin strand 20 is passed along a side surface of the second core member 10B on a side opposite to the aforementioned side surface of the first core member 10A. The core members 10 are successively stacked one on top of another with the thermoplastic resin strand 20 routed in between in a meandering pattern as described above and pressurized in the direction of an arrow P shown in FIG. 1A. The core members 10 thus stacked are then heated so that the thermoplastic resin strand 20 melts between the adjacent core members 10, thus forming thin filmlike molten parts 20a, 20b on the side surfaces of the core members 10, whereby the core members 10 are firmly bonded to each other by the thermoplastic resin 20 and, as a consequence, the laminated core block 100 is obtained.

Nylon, vinyl chloride, polypropylene, polystyrene and polyethylene are examples of materials usable as the thermoplastic resin 20. The thermoplastic resin 20 should preferably has a melting point of 75° C. to 200° C. to ensure that the thermoplastic resin 20 can withstand temperature increase of the core members 10 and provide ease of manufacture. The thermoplastic resin strand 20 used in the present embodiment is a resin strand made of 12 filaments of low melting point nylon 6 having a melting point of 125° C. to 145° C. that are twisted together to form a single strand having an equivalent diameter of 0.11 mm and a weight of approximately 110 g per 10,000 m.

Figure 3:
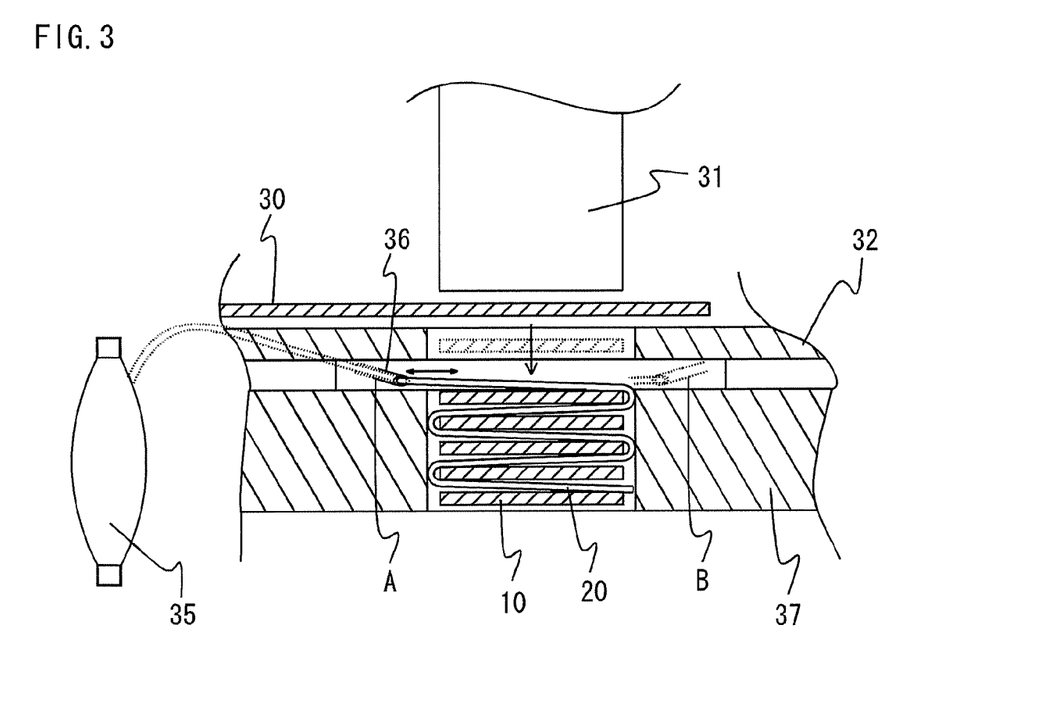
FIG. 3 is a cross-sectional diagram showing an apparatus for manufacturing the laminated core block of the first embodiment.

FIG. 3 is a cross-sectional diagram showing an apparatus and a method for manufacturing the laminated core block 100 of the first embodiment of the invention. As a band magnetic sheet (e.g., electromagnetic steel sheets) 30 unrolled from a hoop is supplied, a punching head 31 descends into a die 32 to successively punch out a plurality of core members 10 from the band magnetic sheet 30. The thermoplastic resin strand 20 is paid out from a bobbin 35 and fed through a nozzle 36 which can be moved back and forth in a space between the die 32 and a stacker 37. The nozzle 36 is controlled to reciprocate between positions "A" and "B" marked in FIG. 3, whereby the thermoplastic resin strand 20 is folded between the core members 10 adjoining in the laminating direction passing along the side surfaces of the core members 10 each time the core member 10 is punched out and stacked in the stacker 37. Subsequently, while pressurizing the stacked core members 10 in the laminating direction, the core members 10 are heated by means of a hot oven or a heater so that the thermoplastic resin strand 20 melts and bonds the core members 10 together to form the finished laminated core block 100.

When pressurized in the laminating direction, the core members 10 are sandwiched from both sides (top and bottom as illustrated) along the laminating direction. Therefore, if pressurizing surfaces of pressure members (not shown) for sandwiching the core members 10 from both sides are held exactly parallel to each other, it is possible to laminate the laminated core block 100 in such a manner that the laminated core block 100 has a fixed lamination height all over an entire surface area thereof no matter whether the individual core members 10 have thickness deviations. This is because the molten thermoplastic resin strand 20 flexible enough to take any shape to fill up uneven gaps between the core members 10 and absorb the thickness deviations of the core members 10, if any. Additionally, if side pressure members (not shown) set up at right angles to the pressurizing surfaces of the aforementioned pressure members are provided to apply side pressures to side surfaces of the core members 10 where the molten parts 20a, 20b of the thermoplastic resin 20 are not formed, it is possible to obtain a high-precision laminated core block 100 with minimal inclination of the side surfaces with respect to a bottom surface thereof.

Figure 4:
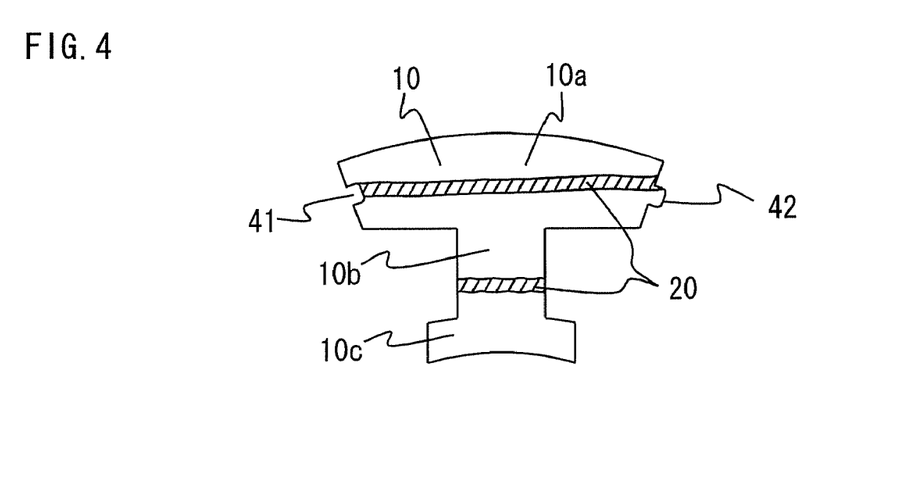
FIG. 4 is a plan view showing an arrangement made between individual core members of the laminated core block in one variation of the first embodiment.

FIG. 4 is a plan view showing an arrangement made between individual core members 10 of a laminated core block 100 in one variation of the first embodiment. In the generally T-shaped core member 10 of FIG. 2, the yoke portion 10a has flat-shaped side surfaces. By comparison, the core member 10 shown in FIG. 4 has a recessed part 41 formed in one side surface of the yoke portion 10a and a protruding part 42 formed on the opposite side surface of the yoke portion 10a as illustrated. To produce a laminated core used in a ring-shaped stator, a plurality of such laminated core blocks 100 are prepared and joined together in such a manner that the protruding part 42 of one laminated core block 100 fits into the recessed part 41 in the circumferentially adjacent laminated core block 100. In this variation of the embodiment, dimensions of the recessed part 41 and the protruding part 42 to be fitted to each other are so determined as to produce an appropriate clearance (play) therebetween. The thermoplastic resin strand 20 placed between the core members 10 is hooked on and folded back from the recessed part 41 and a root portion of the protruding part 42 of each core member 10 in a process of stacking the core members 10. Therefore, compared to the arrangement of FIG. 2 in which the yoke portion 10a has the flat-shaped side surfaces on both sides, variations in the location of the thermoplastic resin strand 20 are reduced since the thermoplastic resin strand 20 is hooked on the recessed part 41 and the root portion of the protruding part 42 of each core member 10. Additionally, this arrangement makes it unnecessary to care about slippage of the thermoplastic resin strand 20 due to the surface property (e.g., surface roughness) of the core members 10. A consequent effect is that the thermoplastic resin strand 20 can easily be routed at a desired position of each core member 10 with high productivity. Also, to facilitate a process of fitting the protruding parts 42 into the corresponding recessed parts 41 when assembling a plurality of laminated core blocks 100 to produce a laminated stator core, the cross-sectional area of the thermoplastic resin strand 20 must be properly determined so that the laminated core blocks 100 to be mated have a proper fit and the thermoplastic resin strand 20 produces a desirable cushioning effect. In addition, if the laminated core blocks 100 are heated by use of a heater or induction heating in the process of fitting the protruding parts 42 into the corresponding recessed parts 41, the molten parts 20a, 20b of the thermoplastic resin strand 20 would remelt, serving to improve bond strength between the laminated core blocks 100 and stiffness thereof.

According to the above-described first embodiment, the thermoplastic resin strand 20 is continuously routed between the adjacent core members 10, melted by application of heat and cured to thereby bond the core members 10 together, rendering swaging operation unnecessary and making it possible to produce the laminated core blocks 100 with reduced degradation of magnetic property and iron loss thanks to minimal risk of processing deformation and short circuits between laminations.

The thermoplastic resin strand 20 has a threadlike structure and is continuously routed to melt and cure between the laminated core members 10. Unlike the case of the swaging operation in which individual core members are locally joined at protruding and recessed parts, the thermoplastic resin strand 20 joins the individual core members 10 over specific surface areas so that the laminating process of the embodiment makes it possible to increase the stiffness of the laminated core blocks 100 and manufacture a motor or the like whose laminated core blocks 100 produce substantially reduced electromagnetic interference and vibration.

The thermoplastic resin strand 20 having the threadlike structure is continuously placed between the laminated core members 10 as mentioned above. Unlike the earlier described conventional method of laminating a plurality of core members by an adhesive applied to bonding surfaces thereof, the laminating process of the embodiment using the continuously routed thermoplastic resin strand 20 makes it possible to manufacture laminated core blocks 100 having high accuracy in shape and strength by stably using a least sufficient quantity of thermoplastic resin to produce a thin resin layer for ensuring the accuracy and strength, yet absorbing accumulated dimensional errors caused by thickness deviations of the core members 10.

Furthermore, since the thermoplastic resin strand 20 for joining the core members 10 has an easy-to-handle threadlike structure, the thermoplastic resin strand 20 can easily be positioned and routed between the adjacent core members 10 without the need for laborious operation to cope with the earlier discussed problems of the conventional laminating method related to production line management and maintenance, such as sagging, clogging and webbing of the adhesive. As the thermoplastic resin strand 20 can be heated to melt for bonding the core members 10 at any convenient time during a laminated core manufacturing process, it is possible to produce the laminated core blocks 100 with high productivity.

Moreover, when the laminated core blocks 100 are to be disposed of, the laminated core blocks 100 can be disassembled by remelting the thermoplastic resin 20 by application of heat. This feature of the embodiment serves to reduce recycling cost of laminated stator cores.

Second Embodiment

While the foregoing discussion of the first embodiment has described the arrangement in which the thermoplastic resin strand 20 is laid in the direction generally at right angles to the projecting direction of the tooth portion 10b of each core member 10, this arrangement may be so modified that the thermoplastic resin strand 20 runs across the tooth portion 10b of each core member 10 in a direction generally parallel to the projecting direction of the yoke portion 10a along two lines located generally symmetrically about a center line of the tooth portion 10b according to the present invention.

Figure 5:
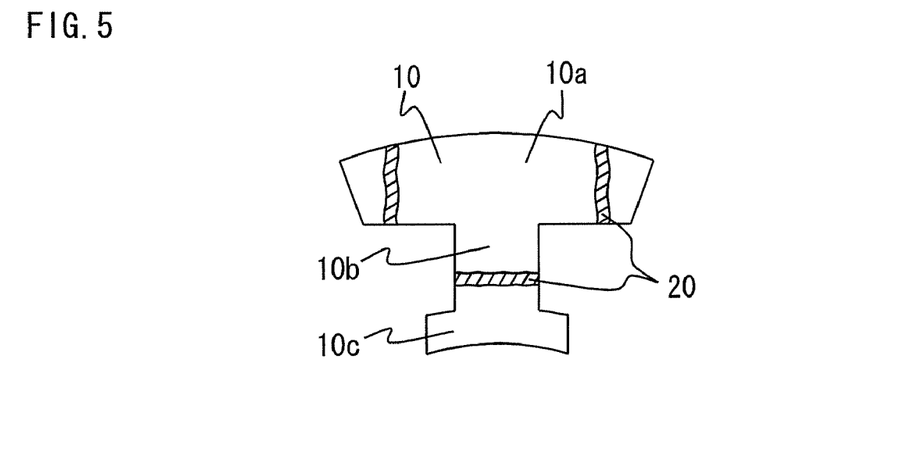
FIG. 5 is a plan view showing an arrangement made between individual core members of a laminated core block according to a second embodiment of the invention.

FIG. 5 is a plan view showing the structure of a laminated core block 100 according to a second embodiment of the invention. In this embodiment, the thermoplastic resin strand 20 is arranged between the individual core members 10 to run across the tooth portion 10b of each core member 10 in the direction generally at right angles to the projecting direction of the tooth portion 10b and across the yoke portion 10a in the direction generally parallel to the projecting direction of the tooth portion 10b along the two lines located generally symmetrically about the center line of the tooth portion 10b as illustrated. The thermoplastic resin strand 20 laid across the tooth portion 10b and the yoke portion 10a passes along the side surface of each core member 10 and is then routed between the next two core members 10 adjoining in the laminating direction. The second embodiment uses otherwise the same procedure as the first embodiment for stacking and pressurizing the core members 10.

The laminated core block 100 of this embodiment is such that a dimension of each yoke portion 10a as measured in the projecting direction of the tooth portion 10b (i.e., the wall thickness of a ring-shaped laminated stator core, or the thickness of the stacked yoke portions 10a as measured in a radial direction thereof) is smaller than a dimension of each yoke portion 10a as measured in the direction generally at right angles to the projecting direction of the tooth portion 10b (i.e., the circumferential length of the stacked yoke portions 10a of the ring-shaped laminated stator core). With this kind of laminated core blocks 100 configured with the thermoplastic resin strand 20 laid along the two lines generally parallel to the projecting direction of the tooth portion 10b, it is possible to obtain a well-balanced bond strength of the laminated core members 10 with the amount of use of the thermoplastic resin strand 20 decreased.

Figure 6:
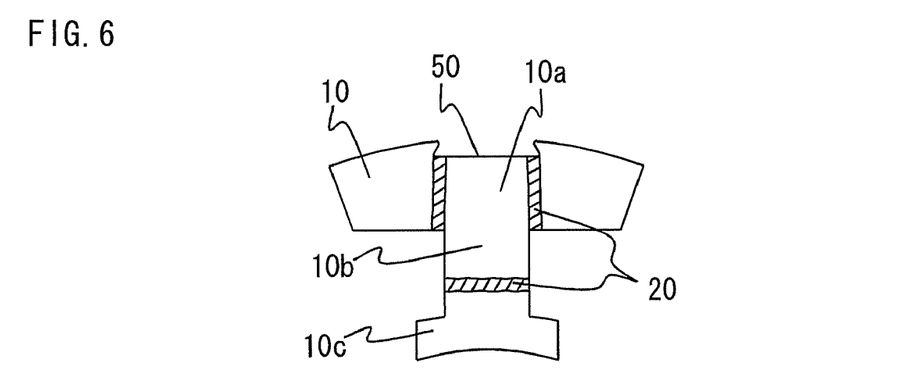
FIG. 6 is a plan view showing an arrangement made between individual core members of the laminated core block in one variation of the second embodiment.

FIG. 6 is a plan view showing an arrangement made between individual core members 10 of a laminated core block 100 in one variation of the second embodiment. As depicted in FIG. 6, the yoke portion 10a of each core member 10 has a cut-out part 50 formed in an outer peripheral side of the yoke portion 10a opposite to the tooth portion 10b on a line extended therefrom. The cut-out parts 50 of the individual core members 10 are useful in the manufacture of the laminated core block 100, for chucking the core members 10 in a coil winding process, for example. When the core members 10 are laminated to form the laminated core block 100, the cut-out parts 50 together form a channel in the laminated core block 100 which is useful for circulating a refrigerant, for example. Two sections of the thermoplastic resin strand 20 are laid between a root portion of the projecting tooth portion 10*b* and both corners of the cut-out part 50 and folded back to be routed between the next two core members 10 adjoining in the laminating direction. Since both corners of the cut-out part 50 can be used for positioning the two sections of the thermoplastic resin strand 20 on each core member 10, it is possible to obtain a well-balanced bond strength of the laminated core members 10 while arranging the thermoplastic resin 20 with high productivity.

Figure 7:
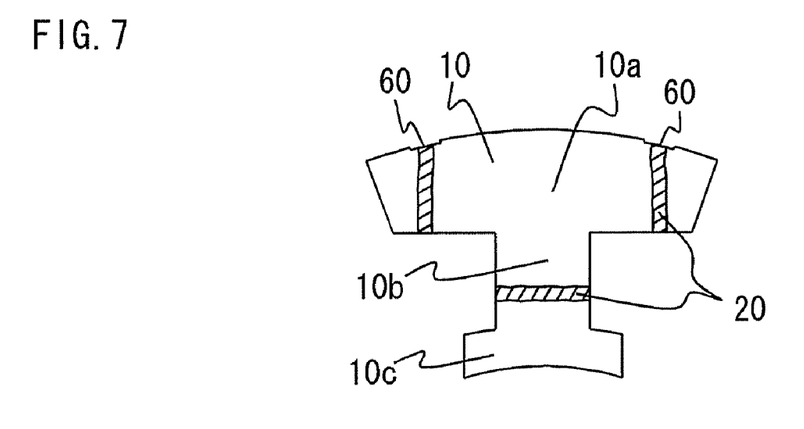
FIG. 7 is a plan view showing an arrangement made between individual core members of the laminated core block in another variation of the second embodiment.

FIG. 7 is a plan view showing an arrangement made between individual core members 10 of a laminated core block 100 in another variation of the second embodiment. As depicted in FIG. 7, the yoke portion 10*a* of each core member 10 has a pair of cut-out parts 60 formed in an outer peripheral side of the yoke portion 10*a* opposite to the tooth portion 10*b* generally symmetrically about a center line thereof. Two sections of the thermoplastic resin strand 20 are laid between slot-side parts of the yoke portion 10*a* close to both circumferential ends thereof and the pair of cut-out parts 60 and folded back to be routed between the next two core members 10 adjoining in the laminating direction. As the pair of cut-out parts 60 can be effectively used for positioning the two sections of the thermoplastic resin strand 20 on each core member 10, it is possible to obtain such a bond strength that the circumferential ends of the yoke portions 10*a* of the individual core members 10 would not easily peel off while arranging the thermoplastic resin 20 with high productivity.

Third Embodiment

While the thermoplastic resin strand 20 is laid in the direction generally at right angles to or generally parallel to the projecting direction of the tooth portion 10*b* of each core member 10 in the foregoing embodiments, two sections of the thermoplastic resin strand 20 may be arranged to be folded back between the outer peripheral side of the yoke portion 10*a* of each core member 10 and both circumferential ends thereof generally symmetrically at two locations.

Figure 8:
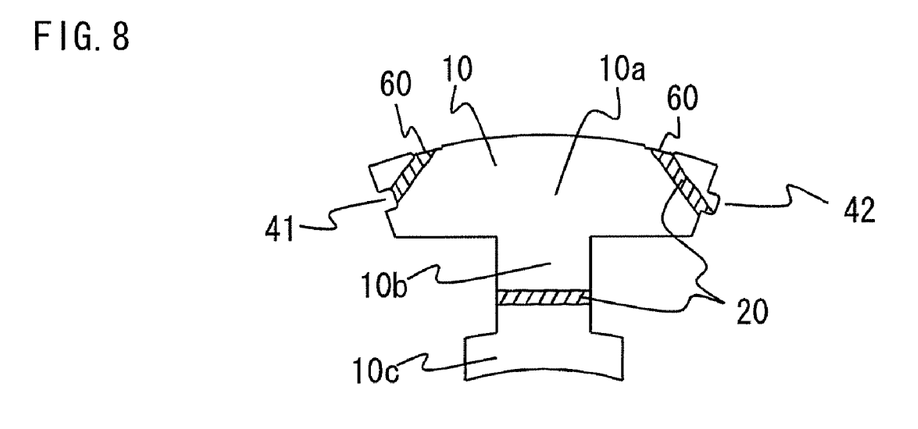
FIG. 8 is a plan view showing an arrangement made between individual core members of a laminated core block according to a third embodiment of the invention.

FIG. 8 is a plan view showing the structure of a laminated core block 100 according to a third embodiment of the invention. As depicted in FIG. 8, the yoke portion 10*a* of each core member 10 has a pair of cut-out parts 60 formed in the outer peripheral side of the yoke portion 10*a* opposite to the tooth portion 10*b* generally symmetrically about a center line thereof. Each core member 10 further has a recessed part 41 formed in one side surface of the yoke portion 10*a* and a protruding part 42 formed on the opposite side surface of the yoke portion 10*a* as illustrated. The thermoplastic resin strand 20 is folded back between one of the cut-out parts 60 and the recessed part 41 of the yoke portion 10*a* and between the other of the cut-out parts 60 and a root portion of the protruding part 42 of the yoke portion 10*a*. This structure makes it unnecessary to care about variations in the location of the thermoplastic resin 20 or slippage of the thermoplastic resin strand 20 due to the surface property of the core members 10. A consequent effect of this structure is that it is possible to easily lay the thermoplastic resin strand 20 between the core members 10 to be laminated with high productivity and obtain such a bond strength that the circumferential ends of the yoke portions 10*a* of the individual core members 10 would not easily peel off.

Fourth Embodiment

The laminated core blocks 100 of the invention described in the foregoing first to third embodiments can be used for producing stators of motors, generators, or the like.

Figure 9:
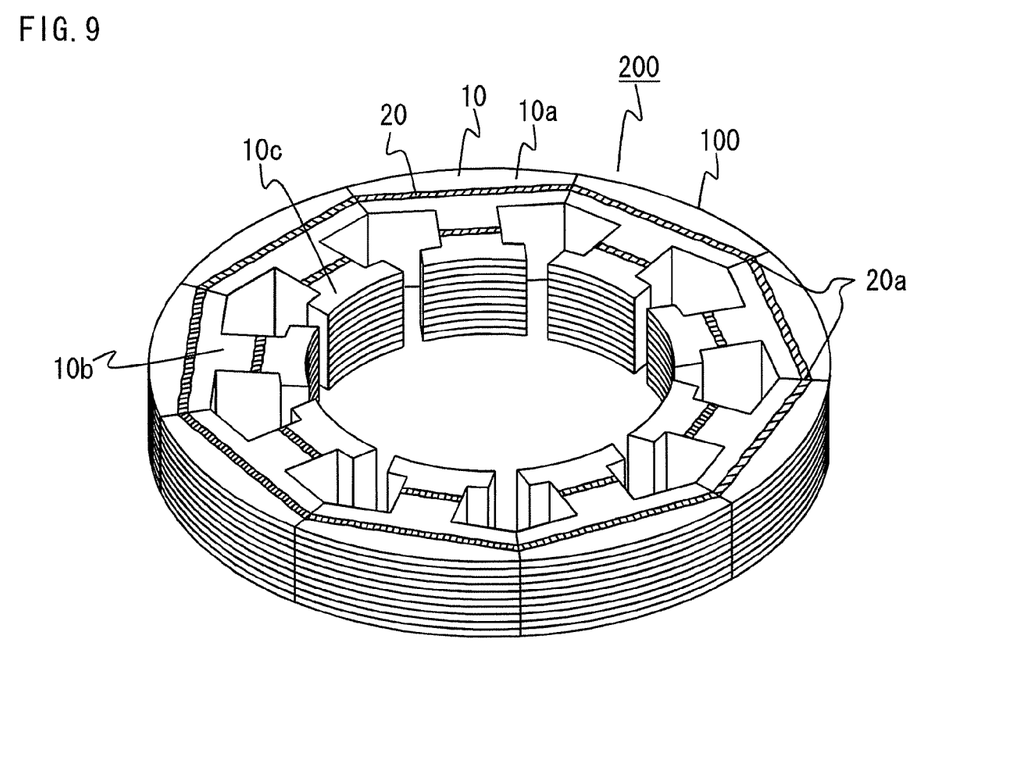
FIG. 9 is a perspective view showing the structure of a stator according to a fourth embodiment of the invention.

Referring to FIG. 9, a ring-shaped stator 200 according to a fourth embodiment of the invention is produced by first preparing a plurality of laminated core blocks 100 each of which is configured with the thermoplastic resin strand 20 laid on and between the generally T-shaped core members 10 side to side across the yoke portions 10*a* and the tooth portions 10*b* thereof in the direction generally at right angles to the projecting direction of each tooth portion 10*b* (refer to FIGS. 1A and 1B), and winding a coil (not shown) around the tooth portions 10*b* of each laminated core block 100. The plurality of laminated core blocks 100 are then arranged in an annular form with opposite circumferential ends of the yoke portions 10*a* of the adjacent laminated core blocks 100 abutted face to face and fixedly assembled by resign-molding the cylindrically arranged laminated core blocks 100 thus arranged into a single unit or shrink-fitting a frame (not shown) on the cylindrically arranged laminated core blocks 100 to complete the production of the ring-shaped stator 200 which may be used in a motor, a generator, or the like.

Even if an external stress is applied to the cylindrically arranged laminated core blocks 100 radially inward from an outer periphery thereof as a result of resign-molding or shrink-fitting operation, thereby causing a contact stress between the adjacent laminated core blocks 100, in the aforementioned process of assembling the stator 200, it is possible to mitigate the contact stress acting between the adjacent laminated core blocks 100, because molten parts 20*a* of the thermoplastic resin strand 20 exist on side surfaces of each laminated core block 100. The above-described structure of the fourth embodiment serves to prevent short circuits between the laminated core members 10, making it possible to manufacture highly efficient motors with reduced iron loss with high productivity.

Figure 10:
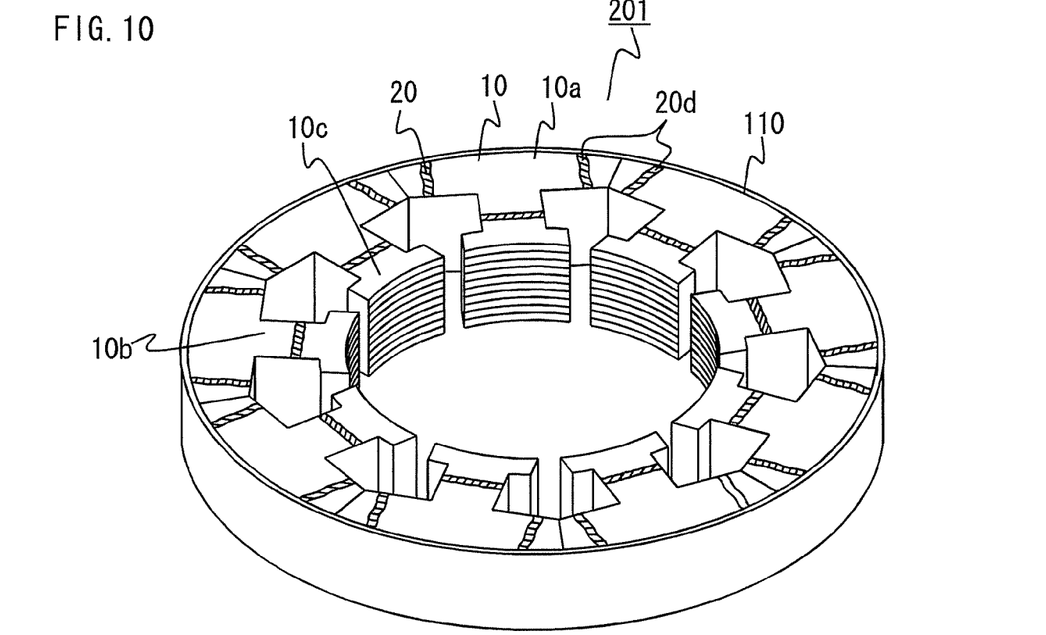
FIG. 10 is a perspective view showing the structure of a stator according to one variation of the fourth embodiment.

Alternatively, a ring-shaped stator 201 is produced by first preparing a plurality of laminated core blocks 100 each of which is configured with the thermoplastic resin strand 20 laid on and between the yoke portions 10*a* of the generally T-shaped core members 10 to run in the direction generally parallel to the projecting direction of the tooth portion 10*b* of each core member 10 (refer to FIG. 5), and winding a coil (not shown) around the tooth portions 10*b* of each laminated core block 100. The plurality of laminated core blocks 100 are then arranged in an annular form with opposite circumferential ends of the yoke portions 10*a* of the adjacent laminated core blocks 100 abutted face to face and fixedly assembled by shrink-fitting or press-fitting a metal frame 110 on the cylindrically arranged laminated core blocks 100 to complete the production of the ring-shaped stator 201 which may be used in a motor, a generator, or the like.

Even if a stress is applied to the cylindrically arranged laminated core blocks 100 radially inward from an outer periphery thereof during shrink-fitting or press-fitting operation in the aforementioned process of assembling the stator 201, it is possible to mitigate a contact stress acting on the laminated core blocks 100, because molten parts 20*d* of the thermoplastic resin strand 20 exist on contact surfaces of the metal frame 110 and the laminated core blocks 100. The above-described structure of this alternative form of the fourth embodiment serves to prevent short circuits between the laminated core members 10, making it possible to manufacture highly efficient motors with reduced iron loss with high productivity.

Although not illustrated, the aforementioned effects of the fourth embodiment can be produced by the laminated core blocks 100 shown in FIG. 8 as well. To achieve these effects, a proper type of thermoplastic resin strand 20 having a cross-sectional area suitable for the depth of the cut-out parts 60 should be selected and routed to produce a layout combining properly selected arrangement patterns.

What is claimed is:

1. A laminated core block comprising:
   a plurality of core members made of magnetic sheets stacked one on top of another, said plurality of core members including first and second core members which adjoin in a laminating direction; and
   a thermoplastic resin strand placed between the first and second core members;
   wherein said thermoplastic resin strand is arranged to pass along one side surface of the first core member, between the first and second core members and along a side surface of the second core member on a side opposite to said one side surface of the first core member in this order, and the first and second core members are bonded to each other by melting and curing said thermoplastic resin strand.

2. The laminated core block according to claim 1, wherein each of said core members has generally a T-shape including a yoke portion and a tooth portion extending from the yoke portion, and said thermoplastic resin strand is arranged to run across the yoke portion of each of said core members in a direction generally at right angles to a projecting direction of the tooth portion.

3. The laminated core block according to claim 2, wherein the yoke portion of each of said core members has a recessed part formed in one side surface of the yoke portion and a protruding part formed on the opposite side surface of the yoke portion, the protruding part having a shape fittable into the recessed part, and wherein said thermoplastic resin strand placed between the adjoining first and second core members is arranged between the recessed part of the first core member and a root portion of the protruding part of the second core member.

4. The laminated core block according to claim 1, wherein each of said core members has generally a T-shape including a yoke portion and a tooth portion extending from the yoke portion, and said thermoplastic resin strand is arranged to run across the yoke portion of each of said core members in a direction generally parallel to a projecting direction of the tooth portion along two lines located generally symmetrically about a center line of the tooth portion.

5. The laminated core block according to claim 4, wherein the yoke portion of each of said core members has a cut-out part formed in an outer peripheral side of the yoke portion opposite to the tooth portion on a line extended therefrom, and said thermoplastic resin strand placed between the adjoining first and second core members is arranged between each corner of the cut-out part formed in the first core member and a root portion of the tooth portion of the second core member.

6. The laminated core block according to claim 4, wherein the yoke portion of each of said core members has a pair of cut-out parts formed in an outer peripheral side of the yoke portion opposite to the tooth portion generally symmetrically about the center line thereof, and said thermoplastic resin strand placed between the adjoining first and second core members is arranged between each of the cut-out parts formed in the first core member and a slot side of the yoke portion of the second core member.

7. The laminated core block according to claim 1, wherein each of said core members has generally a T-shape including a yoke portion and a tooth portion extending from the yoke portion, the yoke portion of each of said core members has a cut-out part formed in an outer peripheral side of the yoke portion opposite to the tooth portion as well as a recessed part formed in one side surface of the yoke portion and a protruding part formed on the opposite side surface of the yoke portion, the protruding part having a shape fittable into the recessed part, and wherein said thermoplastic resin strand placed between the adjoining first and second core members is arranged to run along two lines located generally symmetrically about a center line of the tooth portion between a side surface of the cut-out part formed in the first core member and a side surface of at least one of the recessed part and the protruding part formed on the second core member.

8. The laminated core block according to claim 2, wherein said thermoplastic resin strand is arranged to run across the tooth portion of each of said core members in a direction generally at right angles to the projecting direction of the tooth portion.

9. The laminated core block according to claim 4, wherein said thermoplastic resin strand is arranged to run across the tooth portion of each of said core members in a direction generally at right angles to the projecting direction of the tooth portion.

10. The laminated core block according to claim 7, wherein said thermoplastic resin strand is arranged to run across the tooth portion of each of said core members in a direction generally at right angles to the projecting direction of the tooth portion.

11. A stator comprising:
    a plurality of laminated core blocks each of which comprises:
      a plurality of core members made of magnetic sheets stacked one on top of another, said plurality of core members including first and second core members which adjoin in a laminating direction; and
      a thermoplastic resin strand placed between the first and second core members;
      wherein said thermoplastic resin strand is arranged to pass along one side surface of the first core member, between the first and second core members and along a side surface of the second core member on a side opposite to said one side surface of the first core member in this order, and the first and second core members are bonded to each other by melting and curing said thermoplastic resin strand; and
      a coil wound on said plurality of laminated core blocks with an insulator placed in between;
    wherein said stator is produced by arranging and fixing said plurality of laminated core blocks in an annular form.

12. The stator according to claim 11, wherein each of said core members has generally a T-shape including a yoke portion and a tooth portion extending from the yoke portion, and said thermoplastic resin strand is arranged to run across the yoke portion of each of said core members in a direction generally at right angles to a projecting direction of the tooth portion.

13. The stator according to claim 11, wherein each of said core members has generally a T-shape including a yoke portion and a tooth portion extending from the yoke portion, and said thermoplastic resin strand is arranged to run across the yoke portion of each of said core members in a direction generally parallel to a projecting direction of the tooth portion along two lines located generally symmetrically about a center line of the tooth portion.

14. The stator according to claim 11, wherein each of said core members has generally a T-shape including a yoke portion and a tooth portion extending from the yoke portion, the yoke portion of each of said core members has a cut-out part formed in an outer peripheral side of the yoke portion opposite to the tooth portion as well as a recessed part formed in one side surface of the yoke portion and a protruding part formed on the opposite side surface of the yoke portion, the protruding part having a shape fittable into the recessed part, and wherein said thermoplastic resin strand placed between the adjoining first and second core members is arranged to run along two lines located generally symmetrically about a center line of the tooth portion between a side surface of the cut-out part formed in the first core member and a side surface of at least one of the recessed part and the protruding part formed on the second core member.

15. The stator according to claim 12, wherein said plurality of laminated core blocks are arranged in the annular form with opposite circumferential ends of the yoke portions of said adjacent laminated core blocks abutted face to face and fixedly bonded together by said thermoplastic resin strand.

16. The stator according to claim 14, wherein said plurality of laminated core blocks are arranged in the annular form with opposite circumferential ends of the yoke portions of said adjacent laminated core blocks abutted face to face and fixedly bonded together by said thermoplastic resin strand.

17. The stator according to claim 13 further comprising a metal frame which is fitted on an outer periphery of said plurality of laminated core blocks arranged in the annular form with opposite circumferential ends of the yoke portions of said adjacent laminated core blocks abutted face to face, wherein said metal frame fixedly bonded to said plurality of laminated core blocks arranged in the annular form by said thermoplastic resin strand.

18. The stator according to claim 14 further comprising a metal frame which is fitted on an outer periphery of said plurality of laminated core blocks arranged in the annular form with opposite circumferential ends of the yoke portions of said adjacent laminated core blocks abutted face to face, wherein said metal frame fixedly bonded to said plurality of laminated core blocks arranged in the annular form by said thermoplastic resin strand.

19. A method of manufacturing a laminated core block by laminating a plurality of core members made of magnetic sheets stacked one on top of another, said plurality of core members including first and second core members which adjoin in a laminating direction, said method comprising the steps of:
   placing a thermoplastic resin strand between the first and second core members;
   arranging the thermoplastic resin strand to pass along one side surface of the first core member, between the first and second core members and along a side surface of the second core member on a side opposite to said one side surface of the first core member in this order; and
   bonding the first and second core members to each other by melting and curing said thermoplastic resin strand.

* * * * *